United States Patent

Crockett, Sr.

[11] 4,011,804
[45] Mar. 15, 1977

[54] GRILLE TENDER

[76] Inventor: James R. Crockett, Sr., 3327 Zuni Circle, Las Vegas, Nev. 89109

[22] Filed: Jan. 21, 1976

[21] Appl. No.: 651,158

[52] U.S. Cl. .............................. 99/421 H; 74/84 R
[51] Int. Cl.² ........................................ A47J 37/04
[58] Field of Search ............ 99/421, 325, 395, 409, 99/443; 74/84

[56] References Cited

UNITED STATES PATENTS

| 547,349 | 10/1895 | Haldkjar | 74/84 |
| 850,905 | 4/1907 | Busse | 74/84 |
| 2,324,233 | 7/1943 | Parsons | 99/421 P |
| 2,606,664 | 8/1952 | Messick | 74/84 X |
| 3,196,776 | 7/1965 | Norton | 99/421 P |

Primary Examiner—Harvey C. Hornsby
Assistant Examiner—Arthur O. Henderson
Attorney, Agent, or Firm—Clarence A. O'Brien; Harvey B. Jacobson

[57] ABSTRACT

An assemblage for intermittently angularly advancing a rotary grille having a motor-driven spit operatively associated therewith is provided. The assemblage includes an elongated tang supported from a spring clip for lengthwise adjustable positioning of the tang relative to the clip. The spring clip is of a configuration to releasably clampingly engage one end of the aforementioned motor-driven spit for rotation therewith and with the tang extending generally radially of the associated motor-driven spit. The assemblage is supported from the spit adjacent one end thereof over one peripheral portion of the grille and the longitudinal positioning of the tang relative to the clip is such to enable the free end of the tang to project downwardly through an opening of the grille defined between adjacent grille bars or members thereof and to engage one of the grille bars or members each time the free end of the tang swings through it lowermost arc segment as a result of rotation of the spit. Thus, each time the free end of the tang swings through its lowermost arc of rotation, the associated rotary grille will be angularly advanced. In this manner, the grille is intermittently angularly advanced and food placed upon the grille for cooking thereon by cooking heat energy beneath the grille will be orbited about the axis of rotation of the grille and experience more even heat throughout the total cooking time.

9 Claims, 4 Drawing Figures

GRILLE TENDER

BACKGROUND OF THE INVENTION

Various forms of rotary grilles and drive assemblies for rotary grilles have been heretofore designed for the purpose of causing substantially all of the food on a rotary grille to be exposed to substantially the same amount of cooling heat throughout the period of food cooking on the grille. In addition, various forms of intermittently advancing drive mechanisms have been heretofore designed. Examples of rotary grilles and other forms of rotary cooking equipment as well as intermittent drive assemblies including some of the basic structure of the instant invention are disclosed in U.S. Pat. Nos. 304,166, 1,085,531, 2,552,621, 2,588,091, 2,819,667, 3,033,189, 3,085,497 and 3,090,372.

BRIEF DESCRIPTION OF THE INVENTION

The grille tender of the instant invention comprises an intermittent drive assembly for intermittently angularly advancing the rotary grille of a conventional form of barbecue or grille assembly equipped with a rotary grille member as well as a motor-driven spit and includes a single assemblage shiftable along the associated rotary spit having only two components supported from one another for relative adjustment. The grille tender relies upon the rotary grille member of the associated charcoal grille or the like and a motor-driven spit provided with the charcoal broiler, as is conventional. Therefore, the expense involved to provide the grille tender of the instant invention is almost ridiculously low and yet an efficient intermittent drive assembly for the associated rotary grille member is provided.

The main object of this invention is to provide a means for intermittently angularly advancing the horizontally rotatable grille assembly of a standard tub-type charcoal brazier or broiler equipped with an elevated motor-driven skewer, spit or rotisserie bar elevated above the rotary grille member.

Another object of this invention, in accordance with the immediately preceding object, is to provide an intermittent drive assembly having a full range of adjustment so as to be adapted for use in conjunction with different forms of rotary grille members and also grille members which are adjustable in height relative to the base of the associated brazier or broiler in which a charcoal fire or other heat generating means may be disposed.

Another important object of this invention is to provide a grille tender which may be utilized in conjunction with substantially all types of conventional forms of charcoal braziers or broilers of the tub-type equipped with a motor-driven spit.

A further object of this invention is to provide a grille tender which may be utilized in conjunction with an associated tub-type charcoal brazier or broiler without any modifications being required to the brazier or broiler other than to removably clip the grille tender on the rotary spit thereof.

A final object of this invention to be specifically enumerated herein to provide a grille tender in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
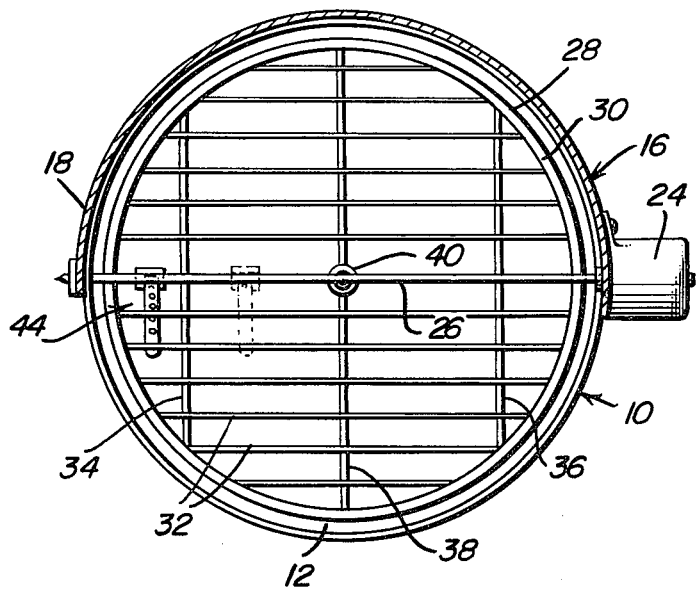
FIG. 1 is a top plan view of a conventional form of tub-type rotary charcoal broiler or the like equipped with a motor-driven spit and with the grille tender of the instant invention operatively mounted on the spit, an alternate position of the grille tender being illustrated in phantom lines and a portion of the hood of the broiler being broken away and illustrated in horizontal section.

Referring now more specifically to the drawings, the numeral 10 generally designates a conventional form of charcoal broiler including a tub-type base 12 in which a charcoal fire may be disposed. The base 12 includes three depending downwardly divergent support legs 14 and the charcoal broiler 10 is equipped with a removable hood structure referred to in general by the reference numeral 16. The hood structure 16 includes a generally semicylindrical wall structure 18 extending about the rear portion of the base 12 and projecting upwardly from the latter. The upper portion of the wall structure 18 is equipped with a partial top wall 20.

The charcoal broiler 10 further includes a motor-driven rotisserie assembly referred to in general by the reference numeral 22. The assembly 22 includes an electric motor 24 supported from one upstanding marginal edge portion of the wall structure 18 and a rotary spit or bar 26 journaled through the upstanding marginal edge portions of the wall structure 18. The motor 24 includes a rotatable output shaft (not shown) which is drivingly connected to the adjacent end of the spit 26 for rotating the latter at slow speeds, the rotary output shaft being driven by the motor 24 through a suitable gear reduction assembly (not shown).

Figure 3:
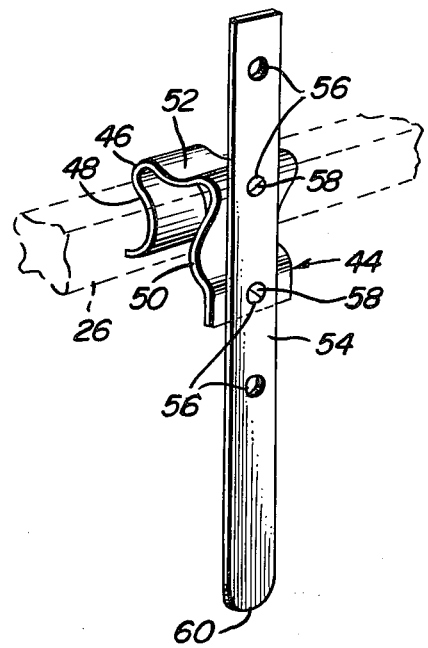
FIG. 3 is a perspective view of the grille tender of the instant invention illustrated in operative position relative to a fragmentary portion of the motor-driven spit illustrated in phantom lines.
Figure 2:
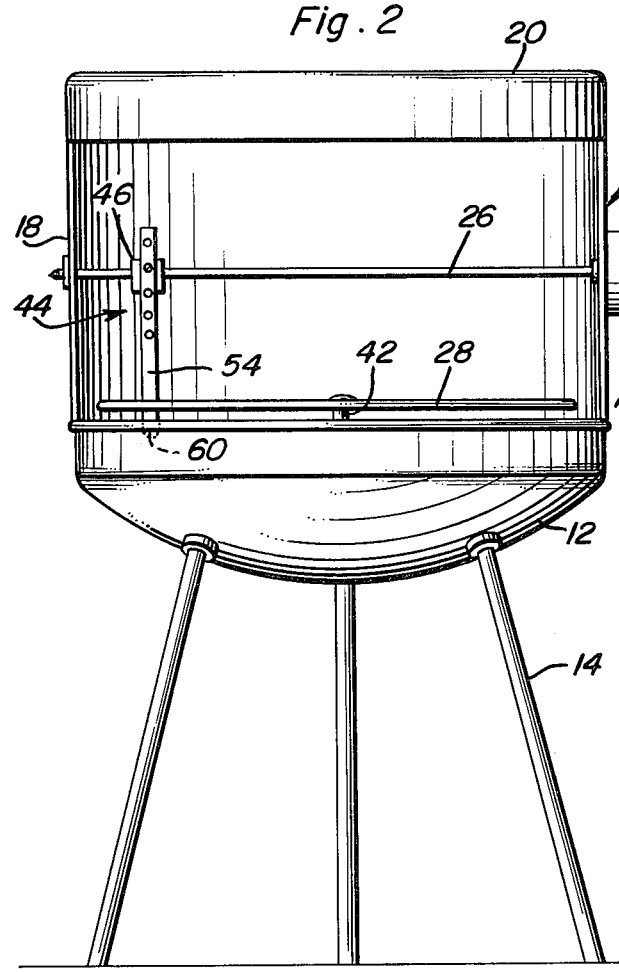
FIG. 2 is a front elevational view of the assemblage illustrated in FIG. 1 but with the grille tender illustrated in a slightly different rotated position.

As may best be seen from FIG. 3 of the drawings, the spit 26 is square in cross-sectional shape and as may be seen from FIG. 1 and 2 of the drawings, the charcoal broiler 10 includes a horizontal grille structure 28. The grille structure 28 includes a circular outer frame 30 crossed by a first set of parallel spaced apart main grille bars 32 and also includes a second set of grille bars 34, 36, and 38 extending thereacross and disposed at substantially right angles to the grille bars 32. The grille bar 38 extends along a diameter of the circular frame 30 and includes an enlarged central portion 40 downwardly through which a vertical axle shaft 42 is secured, the lower end of the vertical axle shaft 42 being removably journaled from the base 12 in any convenient manner (not shown).

As is conventional, the charcoal broiler 10 may be provided with structure (not shown) whereby the height of the axle shaft 42 and thus the grille structure 28 may be varied in relation to the base 12. In this manner, the height of the grille structure 28 above a charcoal fire or other heat source within the base 12 may be adjusted.

It is to be noted that the foregoing comprises a description of a conventional form of charcoal broiler.

The grille tender of the instant invention is referred to in general by the reference numeral 44 and includes a U-shaped spring clip or clamp 46 including a pair of generally parallel legs 48 and 50 interconnected at corresponding ends by means of an integral bight portion 52. The clip or clamp 46 is constructed from a single piece of spring-type heat-resistant strap material and the legs 48 and 50 as well as the bight portion 52 are bowed so as to be inwardly convex in relation to the channel-shaped member defined by the spring clip 46. The grille tender 44 further includes an elongated tine 54 in the form of a stiff heat-resistant strap member. The tine 54 may be constructed in a manner so as to be somewhat flexible and resilient and includes a plurality of longitudinally spaced apertures 56 formed therethrough. A pair of fasteners 58 are removably secured through one pair of adjacent apertures 56 and longitudinally spaced portions of the leg 50 whereby the tine 54 is removably supported from the spring clip 46 and may also be longitudinally shifted in adjusted position relative thereto so as to vary the spacing of the rounded end 60 of the tine 54 from the center axis of the spit 26.

From FIGS. 1, 2 and 3 of the drawings it may be readily understood that the spring clip 46 is embracingly engaged with the spit 26 and thereby supported from the latter for rotation therewith upon operation of the motor 24. Further, the spring clip 46 may be slid along the spit 26 and frictionally retained in adjusted position thereon and, as hereinbefore set forth, the tine 54 may be longitudinally shifted relative to the spring clip 46.

In operation, the grille tender 44 is applied to the spit 26 in the manner illustrated in FIGS. 1, 2 and 3 of the drawings and the tine 54 may be adjusted in longitudinally shifted position relative to the spring clamp 46 according to the vertical distance between the spit 26 and the grille structure 28. Thereafter, the spring clip 46 may be slid along the spit 26 until such time as the rounded end 60 of the tine 54 will be in a position to properly engage the ends of the grille bars 32 and the grille bars 34, 36 and 38 upon rotation of the spit 26. As the free rounded end 60 of the tine 54 swings through the arc of its lowermost travel it is received between adjacent grille bars 32 and engages one of the grille bars so as to intermittently rotatably advance the grille structure 28 each time the free end of the tine 54 swings through its lowest arc of travel.

The end 60 of the tine 54 is rounded so as to minimize the possibility of the outer end of the tine 54 swinging down into direct end engagement with one of the grille bars 32. However, inasmuch as the tine 54 is somewhat resilient and the spring clip 46 is somewhat resilient, if such engagement of the rounded end 60 of the tine 54 with one of the bars 32 or the bars 34, 36 and 38 occurs, the tine 54 may flex so as to enable the rounded end 60 to pass downwardly below the grille bar engaged thereby. Also, if for any reason the rounded end 60 of the tine 54 does not slip past a grille bar 32 during downward swinging movement of the rounded end 60 of the tine 54, the spring clip 46 opens in a direction extending toward the free end 60 of the tine 54 and direct engagement of the rounded end 60 with one of the grille bars and without the rounded end 60 slipping downwardly past that grille bar will result in the spring clip 46 being displaced upwardly relative to the spit 26 and out of engagement therewith so as to avoid damage to the grille structure 28, the tine 54 and/or the motor 24 driving the spit 26.

Figure 4:
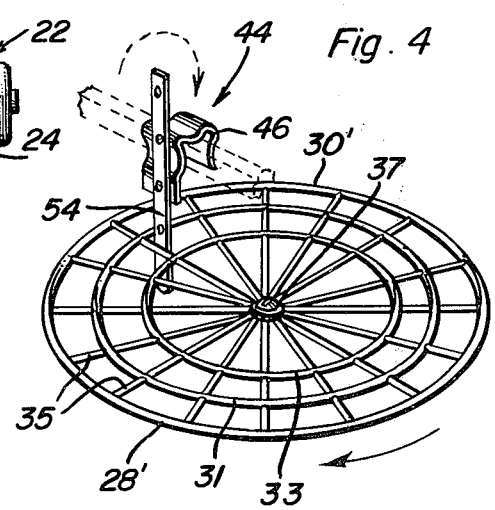
FIG. 4 is a perspective view of a modified form of rotary grille with the grille tender of the instant invention supported in operative position relative to the modified form of rotary grille.

With attention now invited more specifically to FIG. 4 of the drawings, there may be seen a modified form of grille structure referred to in general by the reference numeral 28'. The grille structure 28' includes an outer circular frame 30' and a plurality of concentric smaller diameter circular portions 31 and 33. The grille structure 28' additionally includes radially extending grille bars 35 interconnecting the members 28', 31 and 33 and a central portion 37 for supporting an axle shaft (not shown) corresponding to the axle shaft 42. However, inasmuch as the members 35 extend radially, the engagement of the associated grille tender 44 with the members 35 is more precise. Thus, it may be seen that the grille tender 44 may be utilized in conjunction with various forms of grilles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a broiler of the type including a horizontally disposed rotary grille mounted for rotation about an upstanding axis centrally disposed relative to the plan area of said grille and including sets of grille bars crossed relative to each other, a horizontal elongated motor-driven spit mounted above and extending across said grille, and an elongated drive member transversely mounted on said spit for rotation therewith and including one end portion projecting endwise outwardly from the spit a distance greater than the vertical spacing between said grille and spit engageable with successive grille bars of said grille upon swinging movement of said one end portion of said drive member through its lowermost arc of travel to intermittently angularly advance said grille each time said one end portion swings through said lowermost arc.

2. The combination of claim 1 wherein said drive member one end portion is in the form of a blade end portion disposed in a plane generally paralleling said spit.

3. The combination of claim 2 wherein said drive member one end portion includes a rounded terminal end.

4. The combination of claim 3 wherein at least said one end portion of said drive member is constructed of stiff but somewhat flexible and resilient material.

5. The combination of claim 1 wherein said drive member and spit include coacting means releasably mounting said drive member from said spit and adjustable positioning along the latter.

6. The combination of claim 5 wherein said coacting means include a spring clamp from which said drive member is supported releasably clampingly and slidably engaged with said spit.

7. The combination of claim 6 wherein said spring clamp defines a generally C-shaped body clamped over said spit.

8. The combination of claim 7 wherein said C-shaped body opens toward said one end portion of said drive member.

9. The combination of claim 6 wherein said clamp and drive member include coacting means supporting said drive member from said clamp for lengthwise adjustable positioning of said drive member relative to said clamp.

* * * * *